United States Patent [19]
Schmid

[11] 3,879,889
[45] Apr. 29, 1975

[54] PLANTER

[76] Inventor: Willi Schmid, Spielberg 6, 74 Tubingen 6, Germany

[22] Filed: Sept. 4, 1973

[21] Appl. No.: 393,754

[30] Foreign Application Priority Data
Sept. 6, 1972   Germany.................... 2243762

[52] U.S. Cl............... 47/1.2; 47/38.1; 47/39; 206/423
[51] Int. Cl........................................... A01g 31/00
[58] Field of Search ........... 47/1.2, 38, 38.1, 38.10, 47/39, 40, 36; 206/423

[56] References Cited
UNITED STATES PATENTS

| | | | |
|---|---|---|---|
| 1,139,883 | 5/1915 | Martin | 47/38.1 X |
| 1,928,799 | 10/1933 | Stevens | 47/39 |
| 2,003,986 | 6/1935 | Witthuhn | 47/39 |
| 2,030,268 | 2/1936 | Radley | 47/38.1 |
| 2,638,716 | 5/1953 | Luipersbek | 47/38.1 |
| 2,770,919 | 11/1956 | Shumaker | 47/39 |
| 3,271,900 | 9/1966 | Mori | 47/38.1 |
| 3,557,490 | 1/1971 | Delaney | 47/38.1 |
| 3,576,088 | 12/1968 | Arca | 47/38.1 |
| 3,676,953 | 7/1972 | Delogne | 47/39 |

FOREIGN PATENTS OR APPLICATIONS

| | | | |
|---|---|---|---|
| 403,460 | 12/1933 | United Kingdom | 47/38.1 |
| 1,112,153 | 5/1968 | United Kingdom | 47/38 |
| 289,885 | 10/1965 | Australia | 47/38.1 |
| 1,563,776 | 4/1969 | France | 47/38 |
| 276,343 | 10/1951 | Switzerland | 47/38 |
| 1,024,483 | 1/1953 | France | 47/38.1 |

Primary Examiner—Edgar S. Burr
Assistant Examiner—E. H. Eickholt
Attorney, Agent, or Firm—Walter Becker

[57] ABSTRACT

A planter which comprises a one-piece container with an upper and lower section and an intermediate partition adapted to be removably placed between the upper and lower sections and provided with venting openings and perforations, said container also comprising a bottom with tubular means which extend from the bottom in upward direction and are open at the lower end and are adapted to be engaged by supporting means for supporting the container while a clear side window is arranged within the region of the lower container section.

25 Claims, 10 Drawing Figures

PLANTER

The present invention relates to a one piece planter which is open at the top and has an intermediate bottom which is insertable into the planter body and is provided with perforations for venting the bottom, said intermediate bottom also being provided with cutouts for passing therethrough watering wicks. More specifically, the present invention concerns a planter of the above mentioned type which has an upper part and a lower part adapted selectively to be separated from each other while the bottom of said planter has arranged thereon at least one upwardly extending socket which opens in downward direction.

It is an object of the present invention further to improve a planter of the above mentioned type so that its possibilities of use are increased and that it will permit a simple way of tending the flowers while in spite of these advantages it will remain simple in construction and manufacture.

These and other objects and advantages of the invention will appear more clearly from the following specification in connection with the accompanying drawings, in which:

FIG. 4 is an illustration similar to that of FIG. 1 which shows only the lowermost part of the planter and only a portion thereof in section, FIG. 4 illustrates in particular a further development of the planter body-carrying support.

The planter according to the present invention is characterized primarily in that the plant receiving container is within the region of its lower portion provided with at least one wall having a clear side window therein which in a portion located substantially above the intermediate bottom has a filling opening and is adapted to be mounted on a container support, said container support having associated therewith a socket for receiving a holding member of the container while said socket is open toward the bottom and while tapering in upward direction has a non-round, preferably quadrangular cross section.

A planter of this type which, according to a further feature of the invention, by inserting different types of intermediate bottoms may be employed for the customary growing in soil as well as for the so-called hydroculture, has in view of the sub-division by the intermediate bottom a reservoir for water or nutrient solution which also over greater periods of time, even with sensitive plants, will assure the regular supply of the plant receiving soil with moisture and will also assure that the plants which are kept in a corresponding poured material — filling sub-strate — arranged above the intermediate bottom, will properly receive nutrient substance without additional sprinkling or without the addition of nutrient solution. Due to the fact that the clear side window permits viewing the level of the moisture from the outside, a good control possibility is assured. In view of the filling opening located substantially above the intermediate bottom, it will also be assured that the watering can be effected exclusively above the water reservoir in the lower portion of the container so that when post-filling the water reservoir, moisture sensitive plants will not be excessively watered.

The above mentioned advantages with regard to the growing of plants, and the various possibilities of mounting the plant container are supplemented further by the fact that the plant container can be placed directly on the floor or on a container support so that the plant container according to the invention may be placed for instance in a customary manner on window sills or balconies or while employing the container support may be employed as flower stand which can be placed in living or other rooms wherever desired. In this way, especially when employing suitable material for the planter, the latter will be possible within and outside of the house and can be used to full advantage for summer and winter plants.

Figure 1:
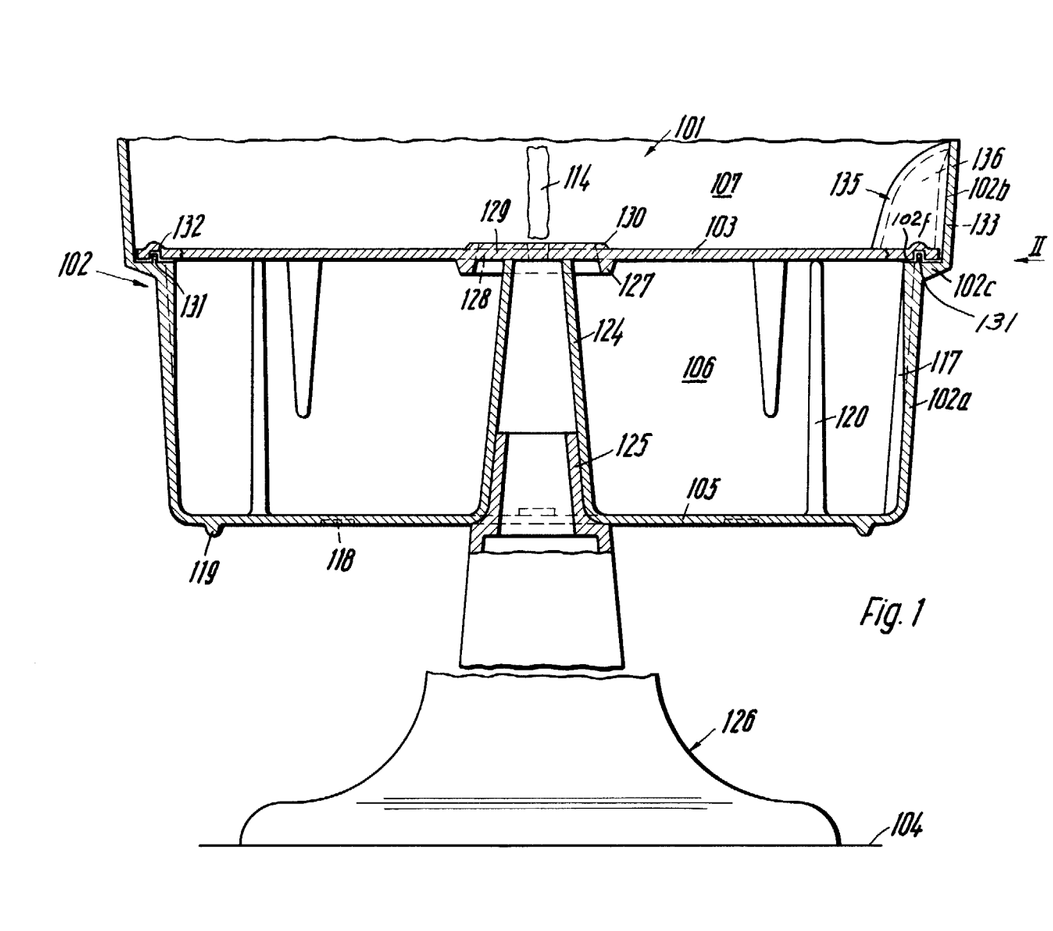
FIG. 1 represents a cross section through a planter according to the invention while of the upper portion only that section has been shown which is adjacent the lower part of the planter, the planter body resting on a support.
Figure 2:
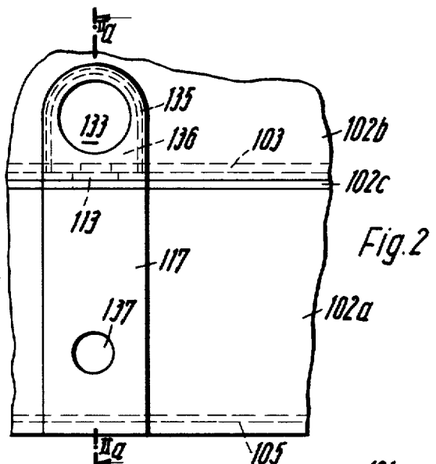
FIG. 2 is a side view of a portion of FIG. 1 as seen in the direction of the arrow II of FIG. 1 and illustrates the lateral portion of the planter body with a window therein.
Figure 3:
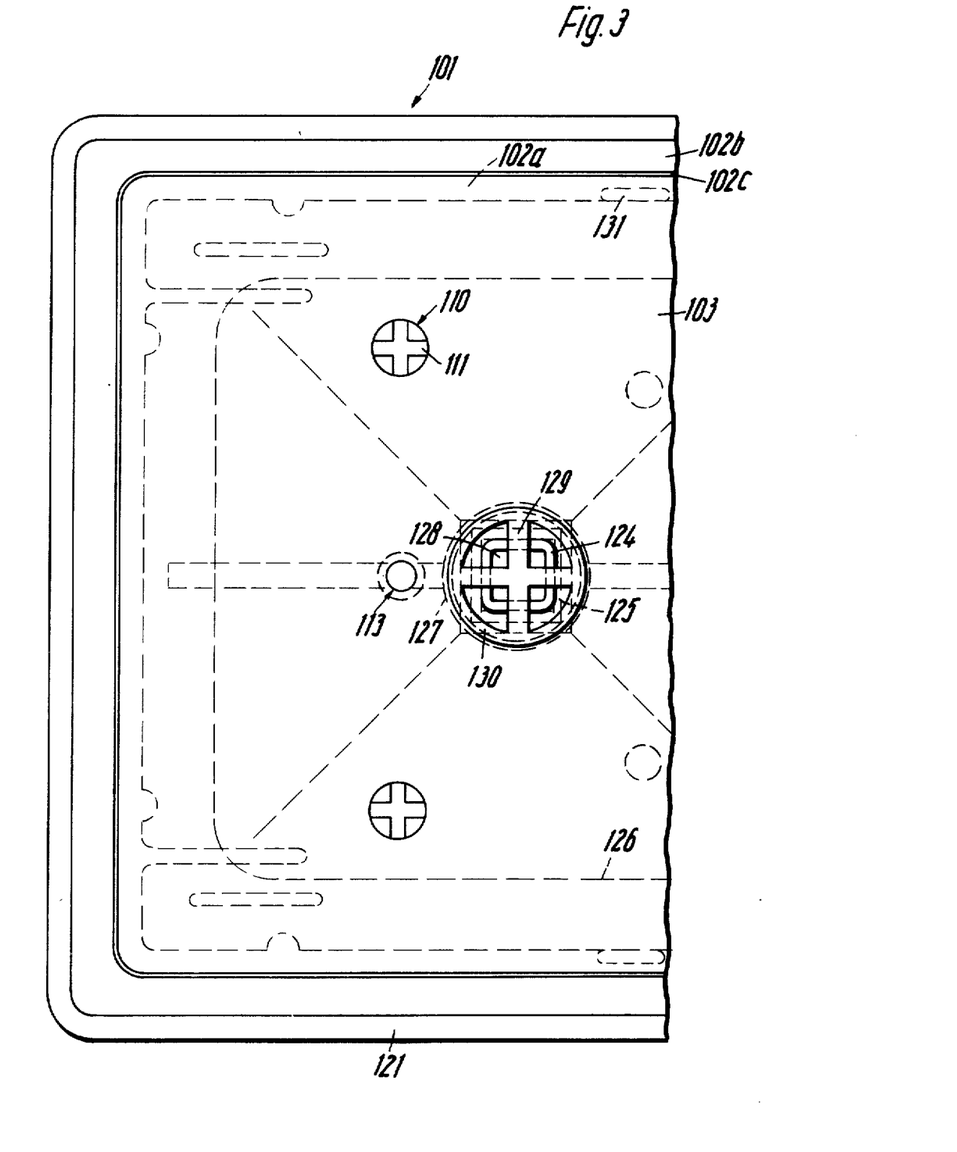
FIG. 3 shows a top view of a portion of the planter with inserted intermediate bottom.

Referring now to the drawings in detail and FIGS. 1–3 in particular, the planter illustrated therein comprises a longitudinal rectangular plant container 101 with side walls 102 which include a lower wall portion 102a and an upper wall portion 102b. The wall portions 102a and 102b which slightly flare in upward direction are interconnected by a wall section 102c which forms a step between said upper section 102b and said lower section or portion 102a while simultaneously furnishing a horizontal supporting surface for the intermediate bottom 103. The intermediate bottom 103 may with regard to the bottom 105 of the plant container additionally be supported by supports 120 (shown in FIG. 1) which end at a plane passing through the supporting surfaces 102f. In addition to supporting the intermediate bottom 103, the supports 120 may also have the function when stacking a plurality of such planter containers for stocking such containers or transporting the same to prevent the respective upper container from being inserted too deeply into the respective lower container so that a jamming or sticking of the containers in each other might occur.

By means of the intermediate bottom 103, the container 101 of the planter is sub-divided in a lower portion 106 and an upper portion 107. When employing the container with an intermediate bottom 103 inserted thereinto, the lower portion 106 serves as liquid storage chamber and has in its central longitudinal portion extending into the container a sleeve-shaped support 124 which when having a quadrangular cross section and being in sleeve form extends over the entire height of the lower portion 106 and which may serve as overflow for limiting the maximum water level in the lower portion of the container. In addition thereto, the sleeve 124, which may have a conical contour as indicated in FIG. 1, serves as receiver for the socket 125 of a container support 126 when as illustrated in FIG. 1, the container 101 is not placed directly on the ribs 119 of its bottom 105. An annular collar 127 extends over the top of the sleeve 124 which is open at the top and at the bottom and the top end of which ends in a plane passing through the supporting surfaces 102f. This annular collar 127 has an inner diameter which according to FIG. 1 is a greater than the greatest width of the sleeve 124 in the upper range surrounded by the annular collar 127.

As indicated in FIGS. 1 and 3, within the annular collar 127 and at the intermediate bottom 103 webs 129 are provided by means of which the intermediate bottom rests on the sleeve 124. Any excess water from the lower container part 106 may pass into the sleeve 124 through the space between said webs 129.

In those regions which are located between the webs 129 arranged perpendicularly with regard to each other, the intermediate bottom 103 may be perforated as shown in FIG. 1, the respective perforations being designated with the reference numeral 128.

Within the region of the zone within which the intermediate bottom 103 rests upon the support 124, the annular collar 127 has at the top side of the intermediate bottom 103 associated therewith a reinforcing ring 130 which permits a very satisfactory connection for correspondingly elevated webs 129 so that also with the provided perforations 128, the intermediate bottom will within this region have the necessary strength and rigidity. If perforations 128 are provided, it will be appreciated that also with a completely filled lower portion 106 which means when the lower portion is filled up to the intermediate bottom 103, a venting of the soil resting on the intermediate bottom will be assured. This is due to the fact that through the sleeve 124 and perforations 128, air can pass into the soil. If the water level in the lower portion 106 has dropped below the above mentioned maximum, the fresh air passing through the sleeve 124 into the lower portion 106 can enter the soil through the venting openings 110 (FIG. 3) which are provided in the intermediate bottom 103. Also these venting openings 110 are preferably bridged by webs 111 in order to prevent the roots from growing through into the lower portion 106.

In distinction form the illustrated embodiment, it may be expedient to select the inner diameter of the annular collar 127 of such a size that it will correspond to the greatest width of the upper end of sleeve 124 which is overlapped by the annular collar 127 and when viewed from the top is non-round. In this way, by means of the intermediate bottom 103, a transverse support of the sleeve 124 will be obtained as it may be expedient in order to exclude damage of the sleeve 124 by the holding member 125 of the container support 126 which holding member extends into the sleeve 124. Such damage could otherwise occur by shock or larger transverse forces between the container support and the container proper. For purposes of obtaining a transverse support of the lateral walls 102 of the container 101, it may furthermore be expedient if, as apparent from FIGS. 1 and 3, cam-shaped elevations 131 are provided on the wall portion 102c, which elevations protrude beyond the supporting surface 102f for the intermediate bottom 103. These elevations 131 have associated therewith in the intermediate bottom corresponding depressions 132. It may furthermore be expedient in this connection if also corresponding recesses are associated with the elevations 131 so that in the transverse direction teeth are obtained. The cam-shaped elevations 131 expediently extend in longitudinal direction.

Figures 2A, 2B:
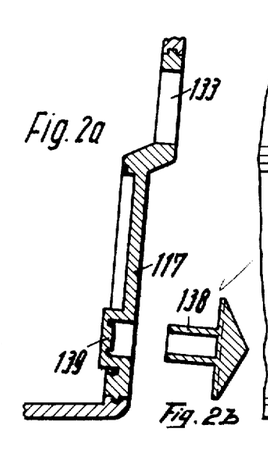
FIG. 2a represents a section taken along the line IIa—IIa of FIG. 2.

The side window 117 which in FIG. 1 is merely indicated, is more clearly shown in FIGS. 2 and 2a in side view and section respectively. More specifically, FIG. 2 shows the filling opening 133 provided in the upper region of the side window 117. If the opening 133 is so located that its lower margin, different from the illustration, is located at the level of the bottom side of the intermediate bottom, the opening 133 can at the same time serve as overflow opening. In order to prevent the release of material such as soil which is located on the intermediate bottom 103, through the opening 133 or in order to prevent soil from being floated into the container bottom portion 106 when pouring water through the opening 133, the intermediate bottom 103 is provided with a hood-shaped cover 135 by means of which within the container there will be screened or shrouded a chamber 136 which is associated with the opening 133 and which is open toward the lower portion 106.

Preferably in the window but possible also on another portion of the container of the planter, there may in conformity with the showing of FIGS. 2 and 2a be provided an outlet opening 137, more specifically, near the bottom. This outlet opening will permit the discharge of the water at any desired time and will also permit an exchange of the water. The opening 137 has associated therewith a closure member 138 which may be formed by a stopper. (FIG. 2b) The filling opening 133 may for purposes of increasing the liquid level also be closed for instance by a stopper.

FIG. 2a shows the outlet opening 137 in the form of a blind hole the bottom 139 of which may at any desired time, if desired also by means of the stopper 138 be pierced so that the container in its basic design will have no discharge opening but in which the discharge opening can be broken up or created at any desired time.

The window 117 is, as will be evident from the drawings, provided with outwardly directed steps in conformity with the contour of the wall within the region of the step 102c. The window 117 is, during the manufacture of the planter according to the invention, which is preferably injection molded of any suitable material, inserted while the mold is open and will be molded in during the molding action so that an absolute firm and tight connection will be obtained.

As container support 126, a foot with widened mounting surface is provided which in conformity with FIG. 1 has a foot or stand area 104 associated therewith. In the longitudinal direction of the container, a plurality of such stands may be provided which require the mounting of a plurality of corresponding sleeves 124 over the length of the planter container. Instead of legs or stands, also closed lower parts or the like may be provided as supports for the container.

Figure 4:
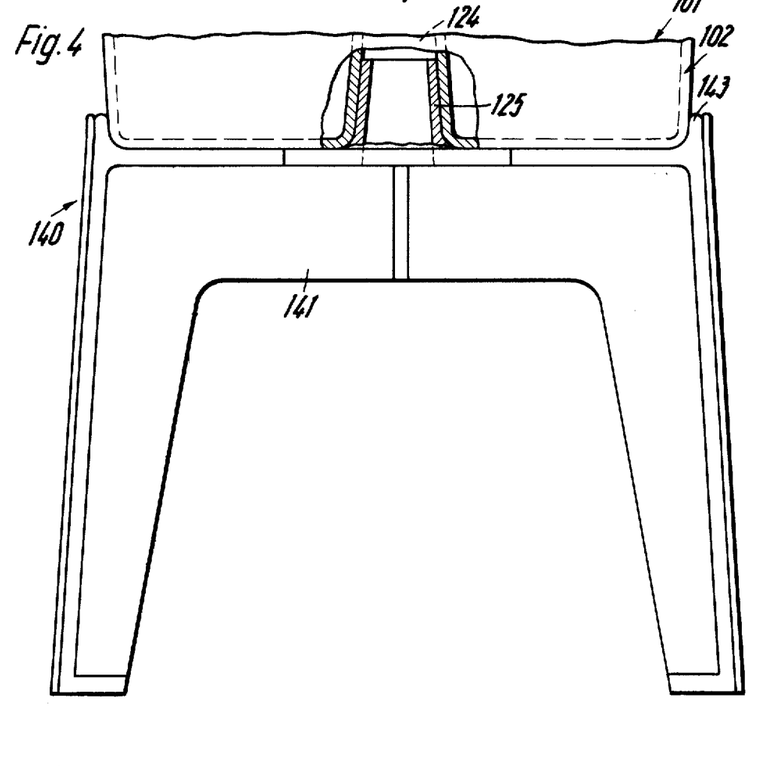

Instead of one-leg supports, it is possible within the ambit of the invention, in conformity with FIG. 4 also to provide supports 140 with two legs. The supports 140 will in such instance be centrally provided with a holding member 125 for engagement with a sleeve 124. The web 141 of the support 140, which is designed so as to permit the discharge of excessive water through the sleeve 124, is provided with guiding extensions 143 which laterally protrude beyond the supporting surface of the web 141 in upward direction. These guiding extensions 143, especially in combination with the anchoring obtained between the holding member and the sleeve result in a particularly stable support.

Also with the emobidment of FIGS. 1-4, the water stored in the lower portion 106 is drawn from the soil through wicks 114 which are passed through bores 113 in the intermediate bottom 103. In addition thereto, containers 101 according to the present invention, the upper portion 107 of which ends in a marginal bead 121 for reinforcing purposes, may be employed as conventional flower box if in the bottom 105 blind holes are provided by depressions 118 which holes can be pierced whenever desired.

Figure 5:
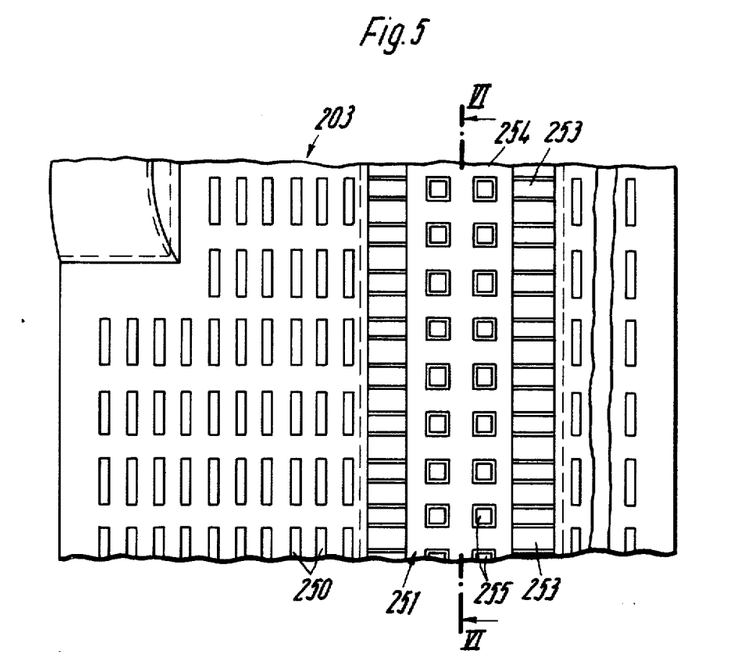
FIG.5 is a top view of a section of an intermediate body and, more specifically, illustrates an embodiment thereof as it is used in particular when employing the planter according to the invention for hydrocultures.
Figure 6:
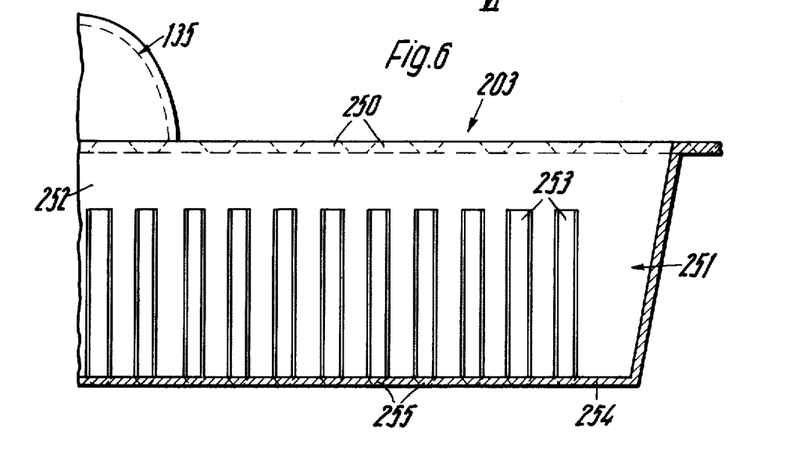
FIG. 6 illustrates a section along the line VI — VI of FIG. 5, and illustrates the intermediate bottom of FIG. 5 in section.

The above mentioned container design is, of course, not limited to containers for planters with rectangular box shape but may also be employed for planters having a pot or cup-shaped configuration. Furthermore, containers for planters of the desired type are also suitable for soil as well as for hydroculture if the respective suitable intermediate bottom is inserted. An intermediate bottom suitable for the hydroculture on which the filling sub-strata is mounted into which the plants are inserted and by means of which the plants are held, is illustrated in detail in FIS. 5 and 6 and designated with the reference numeral 203.

The intermediate bottom 203 according to the embodiment has a plurality of slot-shaped recesses 250 which in actual practice have a width of from approximately 2 to 5 millimeters and which permit the growing through of the roots into the container portion which in FIG. 1 is designated with the reference numeral 106. In this way, the grown-through roots are able to receive nutrient solution stored in the lower portion of the container. In the illustrated embodiment, the intermediate bottom 203 has its longitudinal central portion provided with a trough-shaped depression 251 the side walls 252 of which are arranged in slots 253 extending in upward direction. In the bottom 254 of the trough-shaped depression 251 there are provided perforations 255. The trough-shaped depression 251 by means of which an unimpeded contact will be assured between a portion of the filling sub-strata and the nutrient solution, brings about that on the basis of the capillary effect inherent to the filling sub-strata a good distribution of the nutrient solution and thereby a good supply of the root system will be obtained.

Whereas with the above mentioned intermediate bottom 203, the latter is provided with a trough-shaped depression 251 which extends in the longitudinal direction of said bottom 203 and as shown in FIG. 6, is located below the intermediate bottom plane, it is, of course, possible also to provide other depressions as for instance for bowl-shaped containers which are concentrically arranged with the center of the intermediate bottom. Instead of an annular depression provided on the intermediate bottom for direct contact of the nutrient solution with the filling sub-strata, it is also possible to create confining means by confinements which start from the bottom of the container and may for instance have the shape of vertical lattice walls, wall segments or the like located within the container lower part which means between the bottom of the container and the intermediate bottom. Such confinement may consist of a chamber which communicates with the nutrient solution and which through a corresponding opening in the intermediate bottom communicates with the inner chamber of the container upper portion and thus when filling the container upper portion is likewise filled with filling sub-strata. Thus also in this instance a portion of the filling sub-strata will eventually be located in the nutrient solution. If an intermediate bottom, which is provided with a corresponding opening that corresponds to the cross section of the confined chamber between the intermediate bottom and the container bottom, is selectively to be utilized particularly for soil culture as well as particularly for hydroculture, this opening may for purposes of employing the intermediate bottom with either culture, have a cover associated therewith which as the case may be also contains the opening for the wick as it is necessary in such an instance. Of course, wicks may also be employed when employing the container for hydroculture, in order to safeguard a sufficient wetting of the filling sub-strata.

If a chamber is provided of the above mentioned type and located in the lower portion of the container and is separated from wall portions starting from the container bottom, but within the remaining range of the lower portion of the container is in open connection, the planer container may itself serve as overvessel which means over-pot for customary flower pots if the flower pot placed in the over-vessel is placed upon those parts which extend around the chamber. The flower pot will then be spaced from the container bottom by a distance which corresponds to the height of the water reservoir. The taking in of the liquid into the pot may be effected through a wick which is introduced into the customary venting hole of the pot.

In an analogous manner to the illustration of FIG. 1, a hood-shaped cover 135 may be provided on the intermediate bottom 203 also with the embodiments of FIGS. 5 and 6. This hood-shaped cover 135 serves for screening or shrounding an opening (opening 133 in FIG. 2) which is arranged in a side wall of the container. If for the rooting phase, in other words, that phase in which after the plants have been set their roots have not yet penetrated the intermediate bottom, a greater accumulation of nutrient solution is desired, the overflow openings may be closed up which is easily done by a stopper or the like.

For purposes of increasing the storage capacity with regard to nutrient solution or also the storage capacity with regard to water, it may furthermore be expedient to associate the planter with a saucer or bowl which in a corresponding manner is filled with water or nutrient solution and from which the water or the nutrient solution can pass into the lower container portion. This may, for instance, be realized by breaking open the blind holes formed by the depressions 118. Also such saucer or bowl may in its turn be provided with a filling opening, a side window or the like.

Figure 7:
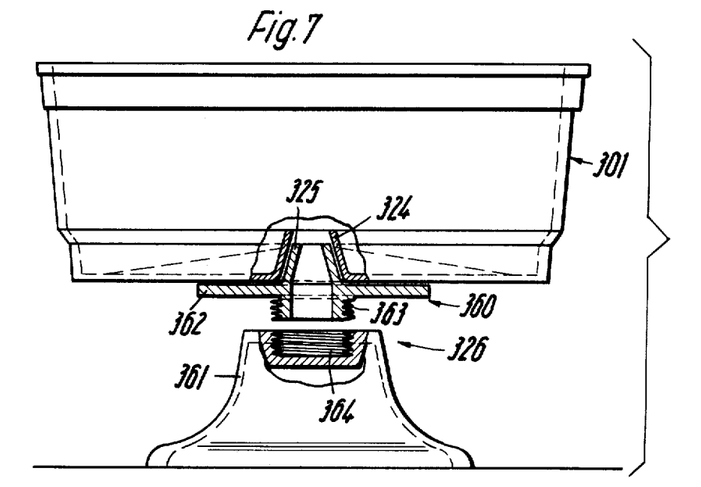
FIG. 7 is a side view of a planter according to the invention partly in section, in which the foot portion serving as planter body is connected to the planter body or container by an intermediate member which comprises an increased supporting surface for the container.
Figure 8:
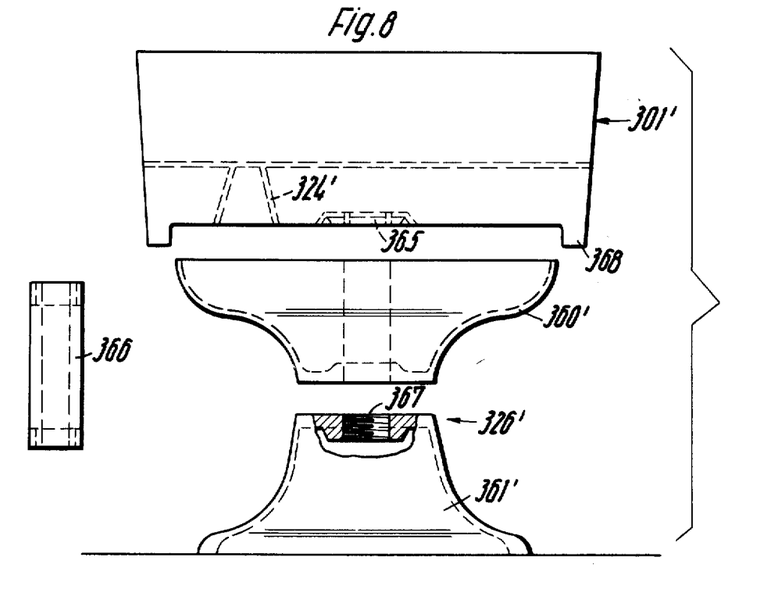
FIG. 8 is a further side view of a planter according to the invention, likewise partially in section, in which between the foot forming the container support and the container there is provided an intermediate member while the foot and container are tightened to each other.

In order to be able to employ substantially identical container supports for planter containers of different sizes, it has proved advantageous, according to FIGS.

7 and 8 to employ container supports 326, 326' which respectively surround an intermediate member 360, 360' by means of which when employing the same type of foot portions 361, 361' an adaptation to the respective design of the planter container can be realized.

FIG. 7 illustrates a relatively large and cup-shaped planter container 301 which is designed substantially in conformity with the previously discussed embodiments. This container 301 has centrally a connection or sleeve 324. In addition to the other possible above mentioned functions, the sleeve 324 serves for receiving the holding member 325 which is formed by a pivot which fits into the sleeve 324 and which in this specific embodiment is hollow and as to its outer cross section is adapted to the non-round counter cross section of said sleeve 324. The holding member 325 is a component of the intermediate member 360 which comprises a supporting plate 362 which with the holding part 325 inserted into the sleeve 324 forms a large surface support for the planter container 301. This large supporting surface permits a relatively weak bottom construction and, more specifically, independent of the corresponding surface of the foot portion 361 to which the intermediate member is connected through a pivot 363. That side of the intermediate member which faces away from the holding member 325 is provided with an outer thread so that the intermediate member 360 is adapted to be screwed into a corresponding recess 364 of the foot portion 361. In this way, an overall stable container support 326 is obtained.

The stability of the container support may be further improved if in conformity with FIG. 8 a regular tightening of the planter container 301' to the container support 326' is effected by a screw connection. To this end, the container 301' has within the region of its bottom side a threaded bore 365 which is associated with the container support 326' and into which the end of a threaded pivot 366 can be screwed, which latter at its ends which are located opposite to each other is preferably provided with counter running thread and may be designed as a hollow pin. The intermediate member 360' is clamped between the container 301' and the foot portion 361' which latter is provided with a corresponding threaded bore 367. The container support 326' is with the embodiment of FIG. 8 designed in the form of a spindle, and the foot portion 306' and the intermediate member 360' are formed by the lower and upper portion of the spindle. The magnitude of the diameter of the intermediate member 360' on that side which faces toward the container 301' is expediently so selected that the intermediate member 360' in its upper end region is located at least nearly fitting between the lateral foot portions 368' of the container 301' whereby the lateral support is greatly improved. By exchanging the intermediate member 360', it is also possible to take into consideration planter containers of different sizes.

The illustration of FIG. 8 shows that in contrast to the above mentioned embodiments, the sleeve 324' may also be provided outside the container center. More specifically, the present case, the sleeve 324' may be arranged in connection with a design of the container support 326' which permits a flowing off of excessive water through the support. For instance, this is possible by corresponding recesses in the face walls of the intermediate member 360' and the foot portion 361' which face walls are facing each other.

It is, of course, to be understood that the present invention is, by no means, limited to the specific showing in the drawings but also comprises any modifications within the scope of the appended claims.

What I claim is:

1. An upwardly open planter which includes in combination: a one-piece container having an upper section and a lower section and an intermediate partition adapted to be removably placed between said upper and lower sections and provided with venting openings and perforations, said container also comprising a bottom with tubular means extending from said bottom in upward direction and being open at its lower end, a clear sight window arranged within the region of said lower section in at least one wall and being provided with a filling opening located substantially above said partition, and support means having an upwardly extending projection fitting into said tubular means and adapted to support said container.

2. A planter in combination according to claim 1, which said tubular means tapers in upward direction and has at least its lower section provided with an inner multi-cornered contour.

3. A planter in combination according to claim 1, in which said tubular section is designed as overflow pipe having its interior in communication with said lower section for limiting the desired maximum water level in said lower container section, said tubular means engaging said partition in a supporting manner.

4. A planter in combination according to claim 3, in which the bottom side of said partition is provided with flange means having an inner diameter exceeding the maximum outer diameter of said tubular means and surrounding the adjacent end portion of said tubular means.

5. A planter in combination according to claim 4, in which that side portion of said partition which is located within the outer circumference of said flange means and faces said tubular means is reinforced by intersecting rib means.

6. A planter in combination according to claim 1, which includes hood-shaped cover means arranged on the inside of and covering up said window from the inside thereof while being located at said partition.

7. A planter in combination according to claim 1, in which the window portion located within the range of said lower section is provided with an outlet opening, and which includes stopper means removably closing said outlet opening.

8. A planter in combination according to claim 1, in which within the range of the window portion located in the region of said lower container section there is provided a marked notched section adapted to be knocked out for forming an outlet opening.

9. A planter in combination according to claim 1, in which the walls of said upper and lower sections are integrally interconnected by a stepped section forming inner supporting surface means for supporting said partition, and which includes stacking supports extending from the interior of said lower section to at least approximately the level of the plane flush with said inner supporting surface means.

10. A planter in combination according to claim 1, in which said support means include added leg means and means for engaging and supporting said container, said last mentioned means having extensions for laterally embracing said container.

11. A planter in combination according to claim 1, in which said container forms a longitudinally extending body, and in which the support means extend over the length of said container.

12. A planter in combination according to claim 10, which includes an immediate member insertable between said added leg means and said container, and means for tightening said leg means and said container with regard to each other.

13. A planter in combination to claim 1, in which said partition is exchangeable, and in which the container is adapted selectively to be equipped with an intermediate bottom particularly for soil culture and is also adapted to be equipped with an intermediate bottom particularly for hydroculture.

14. A planter in combination according to claim 1, in which for purposes of employing the container for hydro-culture, the lower section of the container extending from the bottom of said container to said partition there is confined a chamber which is open toward the container upper portion for receiving the filling substrata and which is adapted to be filled with filling substrata, said chamber being provided with openings communicating with the lower container section adapted to receive nutrient liquid.

15. In combination with a one-piece planter open upwardly and being divided into upper and lower container parts by an intermediate partition provided with perforations for bottom ventilation as well as recesses for passage of watering wicks, said planter having a bottom including at least one support means open upwardly and downwardly, the improvement therewith which comprises a support embodied as a standing foot carried by said support means as holding means for receiving the planter, and socket means for said standing foot inserted positively into said support means.

16. A planter in combination according to claim 15 in which said socket means has an out-of-round cross section and has a mantel surface that engages an inner wall of said support means over substantially entire length thereof.

17. A planter in combination according to claim 15 in which a web makes said socket means unitary with said stand foot, said web supporting the planter over substantially the entire width thereof.

18. A planter in combination according to claim 15 in which said stand foot and said support means are hollow for drainage of fluid entering said support means from above.

19. A planter in combination according to claim 15 in which an intemediate member clamps said stand foot and a container part relative to each other.

20. A planter in combination according to claim 19 wherein said intermediate member forms a supporting plate flanged unitary with said socket means for support of the container part and including a pivot insertable in a corresponding recess in an upper part of said stand foot at an oppositely located side of said socket means.

21. A planter in combination according to claim 20 in which said pivot is externally threaded and screwed into the recess.

22. In combination with a planter open upwardly as divided into upper and lower container parts and having an insertable intermediate partition provided with perforations for bottom ventilation as well as recesses for passage of watering wicks, at least one support means open upwardly and donwardly projecting up from the lower container part bottom, the improvement therewith wherein at least one clear sight window is provided at least in a container wall of the lower part, said clear sight window extending from the lower container part bottom over said intermediate partition to the upper container part, and means forming an inlet opening provided in said planter in a location thereof over said intermediate partition.

23. A planter in combination according to claim 22 in which the inlet opening serves as an overflow opening.

24. A planter in combination according to claim 22 in which means forming a closable drain opening are provided in lower range of said clear sight window.

25. A planter in combination according to claim 24 in which the drain opening is embodied as a nominal required break-through opening.

* * * * *